Feb. 2, 1954 S. I. CORY 2,668,192
TELEGRAPH SIGNAL DISTORTION INDICATING AND MEASURING DEVICE
Filed April 2, 1952 4 Sheets-Sheet 1

FIG. 1

| FIG. 1 | FIG. 3 |
|---|---|
| FIG. 2 | FIG. 6 |

INVENTOR
S. I. CORY
BY
R. C. Terry
ATTORNEY

FIG. 2

INVENTOR
S. I. CORY
BY
R. C. Terry
ATTORNEY

Feb. 2, 1954 S. I. CORY 2,668,192
TELEGRAPH SIGNAL DISTORTION INDICATING AND MEASURING DEVICE
Filed April 2, 1952 4 Sheets-Sheet 4

INVENTOR
S. I. CORY
BY
ATTORNEY

Patented Feb. 2, 1954

2,668,192

UNITED STATES PATENT OFFICE 2,668,192

TELEGRAPH SIGNAL DISTORTION INDICATING AND MEASURING DEVICE

Samuel I. Cory, Towaco, N. J., assignor to Bell Telephone Laboratories, Incorporated, New York, N. Y., a corporation of New York Application April 2, 1952, Serial No. 280,102

7 Claims. (Cl. 178—69)

This invention relates to telegraph testing equipment and more particularly to a portable testing set comprising, among its miniature parts, a miniature cathode-ray tube for indicating both the sign and amount of bias and end-distortion present and the peak value of the total distortion in telegraph signals.

It is an object of this invention to obtain a luminescent indication of both the sign and the amount of bias and end-distortion and the peak value of the total distortion present in signals of the five or six unit permutation code type transmitted over a system without disturbing the transmission of the signals over such system.

It is also an object of the invention to obtain an indication of the sign and the instantaneous values of bias and end-distortion, and the peak value of the total distortion present in signals on start-stop printing telegraph circuits, the indication being in the form of momentary flashes of light or a spot of light appearing in one direction only along the sweep of the electron beam at the horizontal axis on the screen, or face, of a cathode-ray tube.

Another object is to produce flashes of light along the sweep of the electron beam at the horizontal axis of a cathode-ray tube whereby an observer may readily determine the sign and the type of distortion present in the signals, the flashes appearing above the axis to indicate bias and below the axis to indicate end-distortion. A persisting indication of peak value of total distortion is afforded by the position of a spot of light along the axis.

Another object is to adapt the device of the present invention for use with both the five and six unit teletypewriter character signal code at any chosen speed of transmission.

In an embodiment of the present invention the device for indicating the signal distortion is of the portable type primarily for use at customers' stations but it may be used on a permanent basis at the testboard positions in central offices. The device, or set, is all electronic in that no electromagnetic relays are employed and comprises a one-inch cathode-ray tube, miniature vacuum tubes and germanium rectifiers in circuits which operate on a voltage basis rather than on a current basis. This keeps the power requirements small so that only a small self-contained power supply is needed. The set has its own ground, that is, its own voltage reference point, which is not to be confused with the physical or external ground of the subscriber's station or the office wherein the set is employed. The essential parts of the set are an input trigger-tube circuit, a one-shot multivibrator character timer, a multivibrator pulse-timer, an integrating circuit, a horizontal sweep amplifier, differentiating circuits, a peak-distortion indicating circuit, a meter circuit for recording peak-distortion with automatic resetting means and a one-inch cathode-ray tube with a 2½ power optical magnifier.

A feature of the invention is the provision of means for making a local check that is simple and quick without requiring a local source of test signals.

Another feature is the provision of means responsive to signaling pulses for producing along the sweep of the cathode-ray beam at the horizontal axis on the face of the cathode-ray tube momentary upward deflections of the beam, called "pips," to indicate the amount of bias. The gradually receding tails of these pips are in one direction for marking bias and in the opposite direction for spacing bias.

Another feature is the provision of means responsive to signaling pulses for producing along the electron beam sweep at the horizontal axis on the face of a cathode-ray tube momentary downward deflections of the beam, also called "pips," to indicate the amount of end-distortion. The gradually receding tails of these pips are in one direction for marking end-distortion and in the opposite direction for spacing end-distortion.

Another feature is the provision of means responsive to signaling pulses for producing along the electron beam sweep a spot of light, the position of which indicates the maximum amount of the total distortion, or the peak-distortion, present in the signals.

Another feature is the provision of means for obtaining a continuous indication of peak-distortion present in the signals. A resetting circuit automatically operated is incorporated to restore the distortion indication to zero periodically whereby more information is obtained regarding the distortion variations than would be obtained by allowing the meter indication to drift back slowly at a rate determined by leakage across a peak-voltage storage condenser.

Another feature is the provision of static adjustment means used in conjunction with a bias potentiometer in the signal input circuit whereby the accuracy of the bias adjustment is improved, especially, when the set is operated with rounded wave shaped signals as are usually received at the termination of a subscriber's loop circuit. These means provide a "static" method, that is, a steady marking current flows through the input of the set, during adjustment of the potentiometer.

The above and other objects and features of the invention are set forth in the following description and appended claims, and may be more readily understood and considered in conjunction with the accompanying drawings of which:

The set described herein is provided with a "pip-peak" switch 66 having six blades 66—1 to 66—6 and two positions into which it may be operated. In one position "pips" of light are produced on the electron beam sweep along the horizontal axis on the face of the cathode-ray tube to indicate the sign and amount of bias and end-distortion and in the other a spot of light is produced on the electron beam sweep to indicate the amount of peak-distortion. It is provided also with speed switch 52 having four blades 52—1 to 52—4 which are arranged to be positioned for three different speeds of transmission, namely 60 or 75 or 100 speed service.

Figures 1, 6:
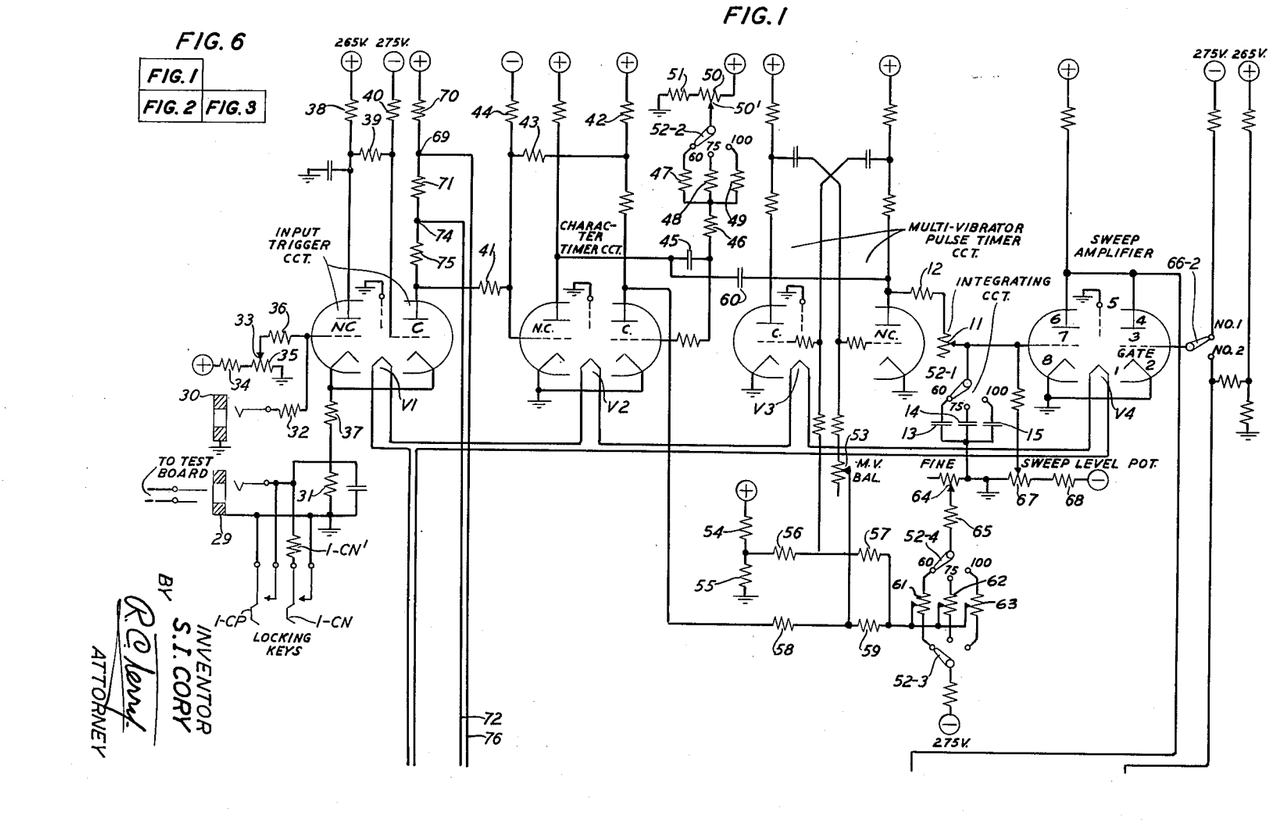
Figs. 1 and 2 show the schematic layout of the electronic distortion indicating set.
Fig. 6 shows the relative arrangement of Figs. 1, 2 and 3.

The input trigger-tube circuit of Fig. 1 performs the same function as an electromagnetic receiving relay. Twin-triode vacuum tube V1 forms part of the input trigger-tube circuit. The left- and right-hand triodes of vacuum tube V1 are designated NC. and C., respectively, to indicate their normal conditions, that is, non-conducting and conducting. The input trigger-tube circuit is arranged to receive neutral signals of any current value between .015 and .080 ampere, polar signals, or electronic hub circuit signals without disturbing the service.

The character timer comprises twin-triode vacuum tube V2 which is a single shot multivibrator. The left- and right-hand triodes are designated NC. and C., respectively, to indicate their normal conditions, that is, non-conducting and conducting. In response to the start pulse, or element, of a start-stop telegraph signal which in this case is a pulse of positive potential, the left-hand triode becomes conducting and the right-hand triode becomes non-conducting inasmuch as the polarity has become reversed by vacuum tube V1. The circuits of these triodes are so arranged that the triodes remain in such operated condition until the stop element of the signal is received.

The pulse-timer is a local source of pulse timing with which the pulse timing of an incoming signal is compared to indicate signal distortion. It uses twin-triode vacuum tube V3 as a free running multivibrator which produces a squared-topped wave having cycles corresponding in number to the elements of a start-stop signal. This multivibrator is positively started by the character timer at the beginning of a teletypewriter character signal and it then runs freely until the end of the signal when it is stopped by the character timer. The left- and right-hand triodes of vacuum tube V3 are likewise designated C. and NC., respectively, to indicate their conducting and non-conducting normal conditions.

The output of the pulse-timer is impressed on an integrating circuit comprising sweep amplitude potentiometer 11, resistor 12 and any one of condensers 13, 14 and 15 having a suitable value for each of the transmission speeds of 60, 75 and 100 speed teletypewriter service, for converting the squared-topped output wave of the pulse-timer into a triangular-shaped wave. The triangular-shaped wave is suitably amplified by means of the left-hand triode of vacuum tube V4 and the right-hand triode of each of vacuum tubes V5 and V6, in series connection, the right-hand triodes of tubes V5 and V6 being of the cathode-follower type. The amplified triangular-shaped wave is applied to horizontal plate No. 6 of cathode-ray tube 16 to cause the electron beam to sweep to and fro along the horizontal axis of the face of the cathode-ray tube 16. The horizontal sweep is adjusted to extend the full length of the 0 to 50 per cent distortion scale along the entire horizontal axis of the face of cathode-ray tube 16.

Connected to the output circuit of right-hand triode of tube V1 are two differentiating circuits. One of these comprises condenser 17 and is connected to vertical deflection plate No. 4 of the cathode-ray tube 16 to produce "pips" along the horizontal sweep on the face of cathode-ray tube 16 at the times of occurrence of transitions in the incoming signal. These "pips" and the positions at which they appear along the horizontal sweep of tube 16 indicate the amount, type and sign of distortion present in the signal. The second differentiating circuit comprises germanium diodes 20 and 21 and associated resistors and condensers. It produces rectified sharp pulses of short duration at the times of occurrence of transitions. These are amplified by the left-hand triode of vacuum tube V5 and then applied to grid No. 5 of the cathode-ray tube 16 in such a direction as to intensify the "pip" indication of distortion. This circuit is also used in providing the peak indication of distortion as is hereinafter described. Diodes 20 and 21 are of the P-N junction type shown in J. H. Scaff-H. C. Theuerer Patent 2,602,211, granted July 8, 1952. This type of rectifier is noted for its high back resistance, high forward conductance, low power requirements, very low capacity effect, and small size.

To indicate peak-distortion the "pip-peak" switch 66 is operated to its No. 2 position. The triangular-shaped sweep voltage appearing on the plate No. 6 of vacuum tube V4 as hereinbefore stated, is sampled at the times of occurrence of transitions and these voltage samples are stored on condenser 18 to control the position of the spot of light along the horizontal axis of cathode-ray tube 16. Sampling is accomplished by using the right-hand triode of tube V4 as a gate triode. This triode is normally conducting. Rectified sharp pulses obtained from the second differentiating circuit hereinbefore described, are amplified and applied to the grid of the gate triode, at the times of occurrence of the transitions in the incoming signals, in such a direction as to cause the triode to be momentarily non-conducting at the time of each transition. A sample of the triangular sweep voltage on the plate of the left-hand triode of tube V4 is therefore present during the non-conducting intervals and this sample is applied to the grid of the right-hand triode of tube V5. The output of the right-hand triode of tube V5 is used to charge condenser 18 in the cathode circuit of the left-hand triode of tube V6. The left-hand triode of tube V6 is used as a rectifier to prevent the charge on condenser 18 from leaking back to ground through resistor 32. Condenser 18 is connected to the grid of the right-hand triode of tube V6 and the output of this right-hand triode, which is, as hereinbefore stated, of the cathode follower type, is applied directly to the horizontal deflection plate No. 6 of cathode-ray tube 16 to cause the cathode-ray beam, indicated as a spot of light, to move to a position along the horizontal axis of tube 16 corresponding to the per cent of peak-distortion in the incoming signals. The high resistance of resistor 18′ which is of a resistance value, say of 500 megohms, the incidental leakage in the condenser 18 and the left-hand triode of tube V6 cause the voltage on condenser 18 to leak off slowly and cause the position of the beam along the horizontal axis of tube 16 to drift back slowly to zero. Should the spot of light stay at the zero end of the axis there would be no distortion present in the signal but should it appear at any other point along the axis the spot would indicate the per cent of peak-distortion present. This persisting type of peak-distortion indication on cathode-ray tube 16 serves the same purpose as the similar indication obtained by the peak-distortion indicating meter of the sets respectively described in F. A. Cowan Patent 2,132,278, granted October 11, 1938, and Rea-Wilkerson Patent 2,370,685, granted March 6, 1945.

The power-supply circuit for the set is a conventional rectifier circuit using selenium rectifiers 23 and 24 for the positive high voltage, say, of about 265 volts and selenium rectifier 25 for the negative high voltage, say, of about 275 volts. A source of alternating current of 60 cycles and 115 volts, such as source 26, furnishes power to transformer 27. Transformer 27 furnishes the above-mentioned positive and negative high voltages and the filament current for tubes V1 to V5 inclusive. A separate transformer 28 furnishes from the same source 26 filament current for tube V6.

DETAILED DESCRIPTION

Input circuit

The telegraph transmission measuring set of the present invention has two jacks 29 and 30, jack 29 being provided for connecting to a line or a trunk circuit on which neutral or polar signals are employed and jack 30 for connecting to an electronic hub circuit using a positive potential of 60 volts for marking and a negative potential of 30 volts for spacing. Both jacks are connected to the input trigger-tube circuit. When jack 29 is used resistor 31 having a resistance value, say of 75 ohms, which is in the cathode circuit of both triodes of tube V1, is inserted in series in the telegraph line or trunk circuit under test. When jack 30 is used resistor 32 having a resistance value, say of 0.82 megohm, is in series between the hub circuit under test and the input circuit to the measuring set. Because of the low input impedance of the measuring set circuit when used with a line or a trunk circuit, and the high input impedance when used with a hub circuit, there is practically no effect on the circuit under test due to the connection of the set to the circuit in either case. Potentiometer 33 comprising resistors 34 and 35 which have resistance values of say 2.0 and 0.1 megohms, respectively, is referred to herein as a bias potentiometer. It is connected to the positive output of the power-supply circuit. In order to adjust the bias potentiometer for incoming polar signals, switch 1-CP is operated to its closed position and the proper adjustment of potentiometer 33 is then made, but when the incoming signals are of the neutral type switch 1-CN is operated to its closed position wherein resistor 1-CN′ having a resistance value equal to that of resistor 31, in this case, 75 ohms, is included in the cathode circuits of tube V1 and the proper adjustment of potentiometer 33 is then made. When potentiometer 33, which furnishes a variable bias for the grid of the left-hand triode of tube V1, is properly adjusted the input trigger-tube circuit has two stable conditions and responds to incoming signals of the start-stop type in much the same manner as an electromagnetic relay. The input trigger-tube circuit in its normal condition, that is, with marking current on the line circuit under test, finds the left-hand triode of tube V1 non-conducting and the right-hand triode conducting. Whereas, when a space signal is on such circuit the left-hand triode becomes conducting and the right-hand triode becomes non-conducting.

It is assumed that the input trigger-tube circuit is connected to a closed telegraph line circuit having a current of 0.062 ampere. The right-hand triode of tube V1 is then conducting and the left-hand triode is not conducting. The voltage drop across resistor 31 due to the flow of current over the line circuit connected to jack 29 is in such a direction as to cause a small negative bias on the grid of the left-hand triode of tube V1. This negative bias added to a negative bias resulting from the flow of plate current from the normally conducting right-hand triode of tube V1, through cathode resistor 37 having a resistance value, say of 1800 ohms, and the positive bias provided by potentiometer 33, causes the grid of the left-hand triode of tube V1 to become negative with respect to its associated cathode and therefore holds the left-hand triode in a non-conducting condition. When the left-hand triode of tube V1 is non-conducting, the plate of the left-hand triode has a high positive potential, the potential being furnished by a fixed potentiometer comprising resistors 38, 39, and 40 having resistance values, say of 0.22, 0.56 and 2.0 megohms respectively. The fixed potentiometer connected to the plate of the left-hand triode of tube V1 is also connected to the grid of the right-hand triode and causes the right-hand triode to be conducting when the left-hand triode is non-conducting.

Figure 5:
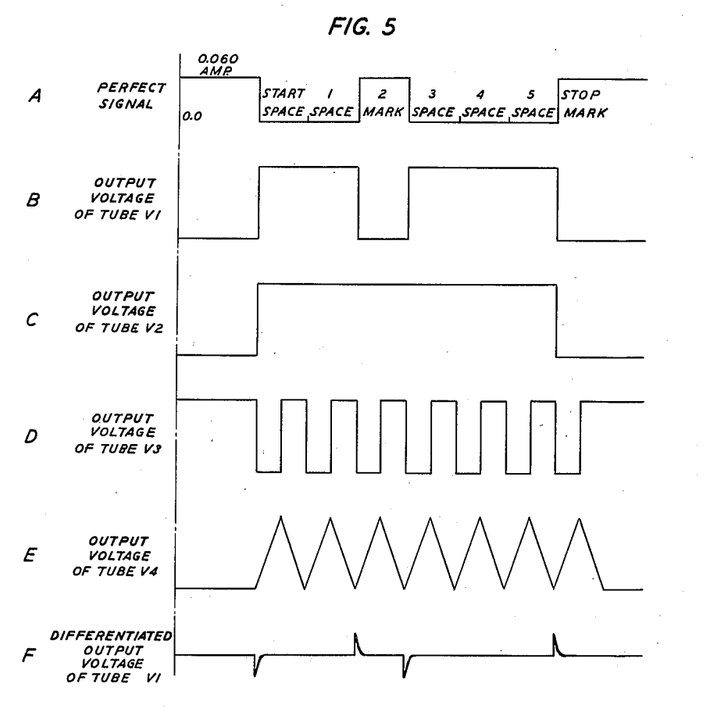
Fig. 5 shows a chart containing a series of traces of operating wave shapes for various parts of the circuit of Figs. 1 and 2.

The spacing condition on the line circuit resulting from the start element of a telegraph start-stop signal received at jack 29, shown in trace A in Fig. 5, causes the effective bias on the grid of the left-hand triode of tube V1 to become positive with the result that the left-hand triode becomes conducting. When the left-hand triode conducts, potential on the plate of the left-hand triode decreases and is no longer effective to hold the grid of the right-hand triode positive. The grid of the right-hand triode becomes negative to cause the right-hand triode to become at this time non-conducting.

The output voltage from the plate of the right-hand triode of tube V1 is about 25 volts when the right-hand triode is conducting as for a marking element of the signal and about 235 volts positive when the right-hand triode is cut off as for a spacing element. The change from high to low potential is very rapid due to the feedback action through the common cathode resistor 37, as is indicated in trace B of Fig. 5.

Potentiometer 33 has sufficient range to permit satisfactory adjustment for the reception of neutral or polar signals of the usual current values. The output of tube V1 is used directly to control the character timer circuit comprising tube V2 and is also applied to the differentiating circuits to furnish indications of the times of occurrence of transitions in the incoming signals as is explained below.

Character-timer circuit

The character-timer circuit is, as heretofore stated, a one-shot multivibrator employing twin-triode tube V2, the tube being controlled by the output of tube V1 through resistor 41 having a resistance value, say of 6.2 megohms. If it is assumed that a stop pulse which is marking, is being received, the plate of the right-hand triode of tube V1 and the plate of the right-hand triode of tube V2 will have low positive voltages. The low positive voltage from the plate of the right-hand triode of tube V1 is applied to the grid of the left-hand triode of tube V2 through resistor 41, and is not effective to overcome the negative voltage supplied from the fixed potentiometer comprising resistors 42, 43 and 44 having resistance values, say of 75,000 ohms, 0.68 megohm and 1.8 megohms, respectively, with the result that the left-hand triode of tube V2 remains non-conducting. When the right-hand triode of tube V1 becomes non-conducting in response to the start element of an incoming signal, the grid of the left-hand triode of tube V2 becomes positive with respect to its cathode and the left-hand triode of tube V2 becomes conducting thereby reducing the positive potential on the plate of the left-hand triode of tube V2. The decrease in potential of the plate of the left-hand triode of tube V2 is applied to the grid of the right-hand triode of tube V2, through condenser 45 which has a capacitance value, say of 0.025 microfarad, and causes this grid to become negative with respect to its cathode and the right-hand triode therefore becomes non-conducting to start a timing interval. During this timing interval the grid of the right-hand triode of tube V2 remains negative and the character-timer circuit does not respond to the other transitions in the incoming signal. About the time when the succeeding stop pulse at the end of the character is received the character-timer circuit returns to its normal condition and remains in such condition until the start pulse of the next incoming signal is received. Upon the receipt of the start element of the succeeding incoming signal the condition of the character-timer circuit is again changed suddenly causing a negative bias to be impressed on the grid of the right triode of tube V2 through timing condenser 45. Resistor 47 is one of three resistors arranged for engagement by blade 52—2 of the speed switch 52 wherein resistor 47 is selected for 60 speed, resistor 48 for 75 speed and resistor 49 for 100 speed, resistors 48 and 49 having resistance values, say of 2 and 0.3 megohms, respectively. Condenser 45 when charging, charges slowly through timing resistors 46, 47 (for 60 speed) and resistors 50 and 51 of the character potentiometer. Resistors 46, 47, 50 and 51 have resistance values, say of 5.6, 3.8, 0.1 and 0.75 megohms.

Because of the slowly changing charge on condenser 45 the grid on the right-hand triode of tube V2 does not become sufficiently positive to permit conduction until approximately the end of the sixth pulse of an incoming signal of a five-unit code character signal. The low positive voltage on the plate of the right-hand triode of tube V2 at this time assists in stopping the pulse-timer circuit as shown in trace C of Fig. 5 and as will be hereinafter described. One setting of the character potentiometer 50' is satisfactory for all speeds with five-unit code signals but it must be readjusted for the six-unit code signals.

Pulse-timer circuit

The pulse-timer circuit is a conventional multivibrator employing twin-triode tube V3. With each triode is the usual feedback circuit and a potentiometer. The potentiometer associated with the left-hand triode comprises resistors 56 and 57 and that associated with the right-hand triode comprises resistors 58 and 59. The former potentiometer applies a fixed positive voltage to the grid of the left-hand triode of tube V3 and the latter potentiometer due to its connection to the plate of the right-hand triode of tube V2 applies a negative or positive voltage to the grid of the right-hand triode of tube V3 depending on whether the right-hand triode of tube V2 is conducting or non-conducting at the time. As hereinbefore stated, during the stop pulse, or element, of an incoming signal the right-hand triode of tube V3 is non-conducting. The resistance value of resistors 54, 55, 56, 57, 58 and 59, all of which form part of the fixed potentiometer, have resistance values say of 0.1, 1.0, 0.68, 0.68, 0.68 and 0.68 megohms, respectively.

Upon the receipt of the start element of an incoming signal, that is, at the transition from marking to spacing, the character-timer circuit operation is started and the voltage at the plate of the right-hand triode of tube V2 increases to a high positive value, as hereinbefore stated. Therefore, the potential of the grid of the right-hand triode of tube V3 becomes positive and of about the same positive value as that on the grid of the left-hand triode of tube V3 assuming that the multivibrator balance potentiometer 53 is properly adjusted. At the same time a negative voltage pulse is applied to the plate of the right-hand triode of tube V3, through condenser 60 which has a capacitance value, say of 0.0002 microfarad. Both of these actions cause the pulse-timer circuit to start promptly. It continues to oscillate freely until the following "stop" pulse, or element, of the signal arrives. The output is represented by the rectangular voltage-wave shown at trace D in Fig. 5. Coarse speed adjustments of the pulse-timer circuit are made at one of variable potentiometers 61, 62 or 63, each of which has a maximum resistance value of 0.1 megohm. The selection of the proper potentiometer of potentiometers 61, 62 and 63 depends upon the speed of transmission on the line circuit under test and is determined by means of switch blades 52—3 and 52—4 of speed switch 52. The fine speed adjustment is made by means of the fine potentiometer 64 which has a maximum resistance value of 20,000 ohms. Switch blade 52—4 is connected to the movable contact of fine potentiometer 64, through resistor 65 which has a resistance value, say of 47,000 ohms. When the speed is properly adjusted the pulse-timer circuit makes one complete cycle for each element length in an incoming signal, as shown at D, Fig. 5.

Integrating circuit

The rectangular voltage-wave at the output of the pulse-timer circuit is converted into the triangular-shaped wave as shown in trace E of Fig. 5 by means of an integrating circuit comprising resistor 12 of a resistance value, say of 10 megohms, sweep amplitude potentiometer 11 having a maximum resistance value, say of 5 megohms, and any one of condensers 13, 14 and 15 having capacitance values of 0.0231, 0.0185 and 0.0142 microfarad, respectively, in cooperation with the input circuit of the left-hand triode of tube V4. The selection of the desired condenser of condensers 13, 14 and 15 is made by means of switch blade 52—1 depending upon whether the speed of transmission on the line circuit under test is of 60, 75 or 100 speed. The integrating circuit has a large time constant. The voltage on the selected condenser reaches only a small fraction of the maximum potential on the plate of the right-hand triode of tube V3 in the time of a half-cycle of the pulse-timer circuit. Accordingly, there is practically a linear change in voltage appearing on the condenser during each half-cycle of the pulse-timer circuit. This triangular wave is amplified by the left-hand triode of tube V4. When the "pip-peak" switch 66 is in its "pip," or No. 1 position, the amplified wave is applied to horizontal deflection plate No. 6 on cathode-ray tube 16, through two cathode-follower triodes, that is, the right-hand triodes of tubes V5 and V6 in tandem, thus causing the desired linear horizontal sweep voltage across the horizontal axis of cathode-ray tube 16. The amplitude of this sweep may be adjusted by means of the sweep amplitude potentiometer 11 so that the luminous trace on the face of the cathode-ray tube 16 extends between the zero and the 50 per cent points (the entire length) on the distortion scale along the horizontal axis. The sweep-level potentiometer comprising resistors 67 and 68 which have resistance values, say of 1.0 and 0.1 megohms, respectively, permits adjusting the steady bias of the left-hand triode of tube V4 so that the output of the tube appears as a triangular wave of equal amplitude and constant "level," that is, all the zero positions of the sweep are just touching the bright luminous spot formed by the electron beam when such beam is at rest at the zero end of the scale. The desired sweep voltage for a teletypewriter character signal is as shown at trace E in Fig. 5 obtained when the sweep level potentiometer and sweep amplitude potentiometer 11 are properly set. The proper adjustment of the sweep level potentiometer predetermines the bias applied to the grid of the left-hand triode of tube V4 to cause grid current to flow when the condenser of condensers 13, 14 and 15 requires its maximum voltage, that is, when the beam is at its zero position as mentioned above. Adjustment of one of the sweep potentiometers affects the other and vice versa, so that it is necessary to adjust one and then the other to obtain the desired amplitude and level.

*Differentiating circuits*

Figure 4:
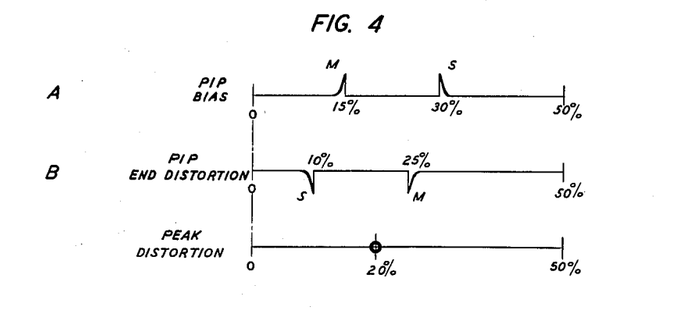
Fig. 4 is a series of charts showing the pip indications of bias and end-distortion and the spot indication of maximum peak-distortion obtained by means of the circuit shown in Figs. 1 and 2.

One of these circuits extends from the connection at the mid-point 69 of resistors 70 and 71, each of which has a resistance value, say of 51,000 ohms in the plate circuit of the right-hand triode of tube V1, over conductor 76, condenser 17 having a capacitance value, say of 0.0002 microfarad, to the vertical deflection plate No. 4 of cathode-ray tube 16. The purpose of this connection is to apply a portion of the transient voltage of the output wave of the right-hand triode of tube V1 to the vertical deflection plate No. 4 of cathode-ray tube 16 in order to cause "pip" indications of distortion along the horizontal axis of tube 16. The change in voltage on the plate of the right-hand triode of tube V1 for a space-to-mark (upward direction) transition causes an upward "pip" and for a mark-to-space (downward direction) transition causes a downward "pip" as shown in trace F in Fig. 5. The rapid voltage change in the potential of the plate of the right-hand triode of tube V1 in response to a transition in an incoming signal causes the initial movement of the electron beam in cathode-ray tube 16 to be rapid and therefore it is barely visible at the beginning of a "pip" but the subsequent relatively slow charging of condenser 17 in a logarithmic fashion through resistor 73 which has a resistance value, say of 1 megohm, appears as a bright trace which slopes to the left for marking bias and to the right for spacing bias as shown in trace A in Fig. 4, and to the right for making end distortion and to the left for spacing end distortion as shown in trace B in Fig. 4.

A second differentiating circuit comprises the connection 74 between resistors 71 and 75, the latter resistor having a resistance value, say of 0.12 megohm, in the plate circuit of the right-hand triode of tube V1, and extends over conductor 72, resistor 22 having a resistance value, say of 82,000 ohms, condenser 77 having a capacitance, say of 0.01 microfarad, through a network comprising germanium diodes 20 and 21. In this second differentiating circuit there is impressed a second portion, different from the first, of the transient voltage of the output of tube V1, on the diodes 20 and 21 to produce across resistors 84 and 85 having resistance values, say of 30,000 and 20,000 ohms, respectively, unidirectional pips corresponding to the transitions in the incoming signal. These pips are applied over switch blades 66—3 and 66—4 of pip-peak switch 66 to the grid of the left-hand triode of tube V5 wherein they are amplified. When pip-peak switch 66 is in its position No. 1, the amplified unidirectional pips are in a positive, or upward, direction and are impressed on the intensity grid No. 5 of cathode-ray tube 16 in a path extending over conductor 78, blade 66—1 of the "pip-peak" switch 66 in its No. 1 position, conductor 79, condenser 80 having a capacitance, say of 0.01 microfarad, resistor 81 having a resistance value, say of 10 megohms, and conductor 82 to the intensity grid No. 5 of the cathode-ray tube 16. These amplified voltage pips serve to intensify the brightness of the "pip" indications appearing along the horizontal axis of tube 16. When pip-peak switch 66 is in its No. 2 position the amplified unidirectional pips are in a negative, or downward, direction and are impressed on the grid of the right-hand triode of tube V4 (a gating triode) to cause this triode to become momentarily non-conducting for the duration of each pip whereby momentary samples of the triangular-shaped sweep voltages available at the plate of the left-hand triode of tube V4 are successively applied to the grid of the right-hand triode of tube V5 to furnish peak-distortion voltages as will now be described in more detail.

*Peak indicating circuits*

To obtain the persisting indication of peak-distortion on the face of cathode-ray tube 16, the triangular-shaped sweep voltage available at the plate of the left-hand triode of tube V4 is sampled at the time of the transitions of the incoming signals and these voltage samples are stored on condenser 18 which has a capacitance value, say of 0.05 microfarad. Condenser 18 is connected in the cathode circuit of the left-hand triode of tube V6 when blade 66—6 of the "pip-peak" switch 66 is in its No. 2 position.

The operation of the circuit is as follows: A portion of the voltage output of tube V1 is differentiated and rectified to obtain unidirectional pips all of which are of negative polarity because of pip-peak switch 66 being in its No. 2 position. The rectifier circuit comprises two parallel paths wherein germanium diodes 20 and 21 are respectively included. The unidirectional output of the rectifier circuit is amplified by the left-hand triode of tube V5 with switch blades 66—3 and 66—4 in their respective No. 2 positions. In the output of the left-hand triode of tube V5, the unidirectional pips of negative polarity are of short duration and substantially uniform height, one pip for each transition in an incoming signal. These negative voltage pips are successively impressed on the grid of the right-hand triode of tube V4 so that the latter triode becomes non-conducting during the interval of each pip which is, of course, at the time of each transition in the received signal. While the right-hand triode of tube V4 is thus momentarily non-conducting, the instantaneous voltage of the triangular sweep which is present on the plate of the right-hand triode of tube V4 is applied to the grid of the right-hand triode of tube V5. The right-hand triode of tube V5 is of the cathode-follower type and the sampled sweep voltage present on its grid causes a charge to be stored on condenser 18 over a circuit extending through the left-hand triode of tube V6, switch blade 66—6 in its No. 2 position, condenser 18 to ground. The grid and plate of the left-hand triode of vacuum tube V6 are connected together so that this triode acts as a rectifier which allows the 0.05 microfarad condenser 18 to charge and then prevents the charge from leaking off through resistor 32 to ground. Condenser 18 is also connected to the grid of the right-hand triode of tube V6. The right-hand triode of tube V6 also is of the cathode-follower type and the output of this triode is applied directly to horizontal deflection plate No. 6 of the cathode-ray tube 16. It will be noted that resistor 18' having a leak resistance value, say of 500 megohms, is connected across condenser 18 in the cathode circuit of the left-hand triode of tube V6 to cause condenser 18 to have a definite amount of leakage and hence to cause the spot of light which serves to indicate the peak-distortion to have a definite but slow drift-back rate. Reset key 83 is associated with condenser 18 so that the condenser may be discharged at will in order to restore the indication to zero.

*Meter circuit for recording peak-distortion*

Figure 3:
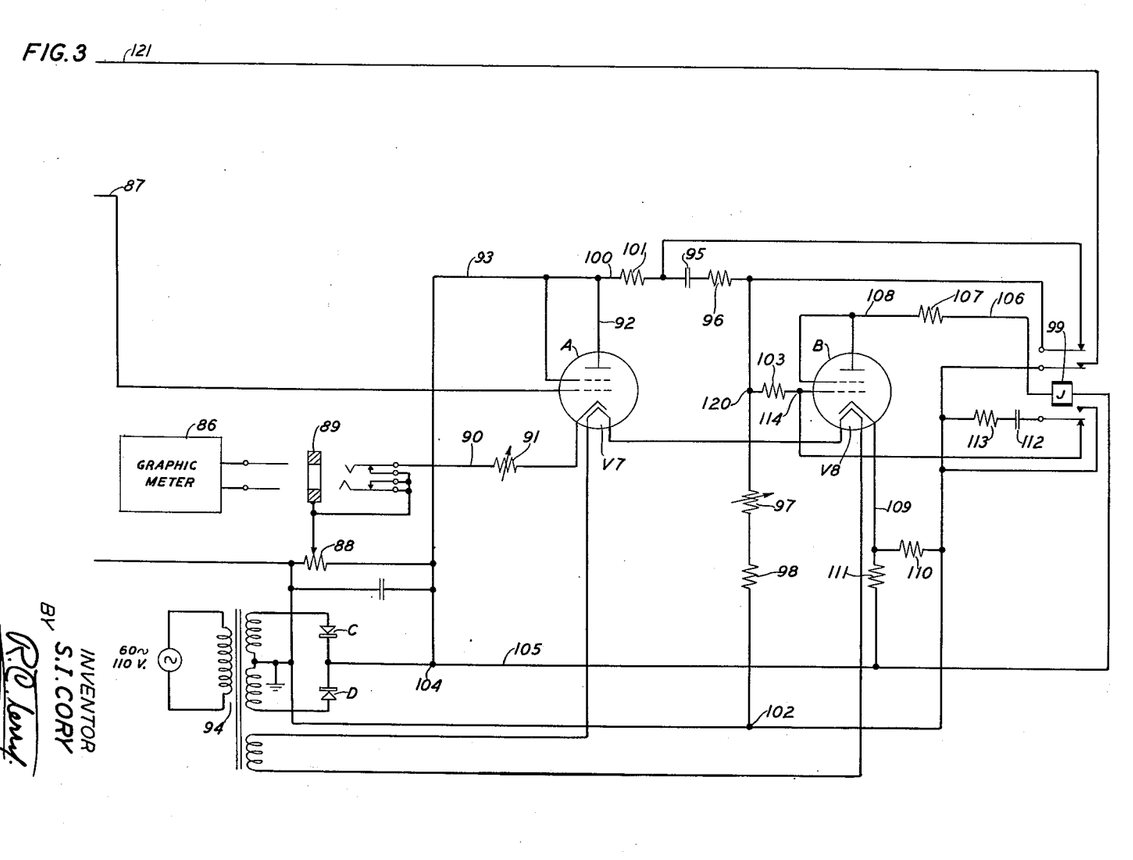
Fig. 3 shows a self-powered circuit including a cathode-follower type of electronic tube for operating a recording meter, and an adjustable reset device for automatically restoring the meter to normal at regularly recurring intervals of predetermined duration.

The peak-distortion may also be recorded on a graphic meter of the portable type such as manufactured by the Esterline-Angus Company of Indianapolis, Indiana. This type of recording provides a continuous record of peak-distortion over long periods of time. The recording meter circuit is shown in Fig. 3 and is self-powered for use on 110 volts, 60 cycles power. It comprises in addition to the graphic meter an amplifier vacuum tube V7 of the cathode-follower type for operating the meter, and an adjustable automatically operated reset circuit which may be set to operate at definite intervals, say of 0.5 to 10 seconds duration. The meter represented by block 86 is plugged into jack 89 for connection to tube V7.

The output of the right-hand triode of tube V6, which is applied directly to horizontal deflection plate No. 6 of cathode-ray tube 16 for indicating the peak-distortion, is also applied over conductor 87 to the grid of tube V7 for operating the recording meter circuit. As a result of this output voltage, current flows in the circuit traceable from potentiometer 88, sleeve of jack 89, graphic meter 86, tip of jack 89, conductor 90, resistor 91, cathode and plate of tube V7, conductors 92 and 93, to the connection point 104 of positive potential connected to the positive side of power transformer 94, whereby meter 86 records the amount of peak-distortion present in the signals incoming at the transmission measuring set. Tube V7 is made sensitive by means of adjustable resistor 91 so that indications made on meter 86 are full scale to the right from the center zero to 50 per cent distortion in a manner corresponding to the peak-distortion indicated along the horizontal axis of the face of cathode-ray tube 16 of the transmission measuring set. Deflections of the meter needle to indicate various amounts of peak-distortion for use in checking the sensitivity setting may be produced by momentarily operating the speed switch 52 in the transmission measuring set to a speed other than that in use at the time and comparing the distortion indicated on tube 16 with that indicated by the recording meter.

The adjustable automatically operated reset circuit provides means for periodically restoring the peak-distortion indication to zero value so as to show on the recorder chart more information regarding the distortion variations than would be obtained by allowing the meter indication to drift back slowly at a rate determined by the leakage across peak-voltage storing condenser 18. In this automatically operated reset circuit is provided condenser-resistance timing by means of condenser 95 and resistors 96, 97 and 98. In this timing circuit the voltage change across resistors 97 and 98 is impressed between the grid and cathode of tube V8 while the condenser is charging. The condenser is discharged quickly by relay 99 in the plate circuit of tube V8 at the end of the timing interval.

At the beginning of a timing operation positive voltage is impressed by the power supply on a circuit path comprising conductors 93 and 100, resistor 101 having a resistance value, say of 10,000 ohms, condenser 95 of a capacitance value of, say 0.5 microfarad, interconnected resistors 96, 97 and 98 having resistance values, say of 3600 ohms, 10 megohms and 50,000 ohms, respectively, to connection 102 on the grounded side of the power supply. This positive voltage is also applied through resistor 103 of a resistance value, say of 1 megohm, to the grid of tube V8 causing its grid to be effectively positive with respect to its cathode. Tube V8 conducts, the current flowing through a path extending from the source of positive voltage at connection 104, conductor 105, through the winding of relay 99, conductor 106, resistor 107 having a resistance value, say of 33,000 ohms, conductor 108, plate and cathode of tube V8, conductor 109, to a fixed potentiometer comprising resistors 110 and 111 having resistance values, say of 5000 ohms and 17,000 ohms, respectively, the potentiometer having its source of supply from connections 104 and 102.

When condenser 95 becomes fully charged from the source of positive voltage at connection 104, the positive potential at connection 120 decreases causing the grid of tube V8 to become negative with respect to its cathode. Therefore, tube V8 becomes non-conducting and causes relay 99 to release. Relay 99 upon releasing, provides (1) at its outer upper armature and back contact a path for discharging condenser 95, which discharges, (2) at its inner upper armature and back contact a path extending over conductor 121 for discharging the peak-distortion measuring condenser 18 in the transmission measuring set and condenser 18 discharges, and (3) at its lower armature and back contact a path including condenser 112 and resistor 113, having one end connected to connection point 114 of positive polarity and the other, to connection point 102 of ground, or negative polarity to effectively delay conduction in tube V8 and consequently the operation of relay 99 for a definite short interval once the relay has released. The charging time of condenser 112 delays the conduction of tube V8 in order that condenser 95 may become fully discharged before tube V8 conducts again to reoperate relay 99. When relay 99 does reoperate at the time tube V8 begins conduction, the closure of the lower armature at its front contact closes a path for discharging condenser 112 and condenser 112 discharges.

The above operations are repeated to effect the automatic discharge of peak-distortion measuring condenser 18 at definite intervals of, say 0.5 to 10 seconds, as desired.

*External oscilloscope*

Figure 2:
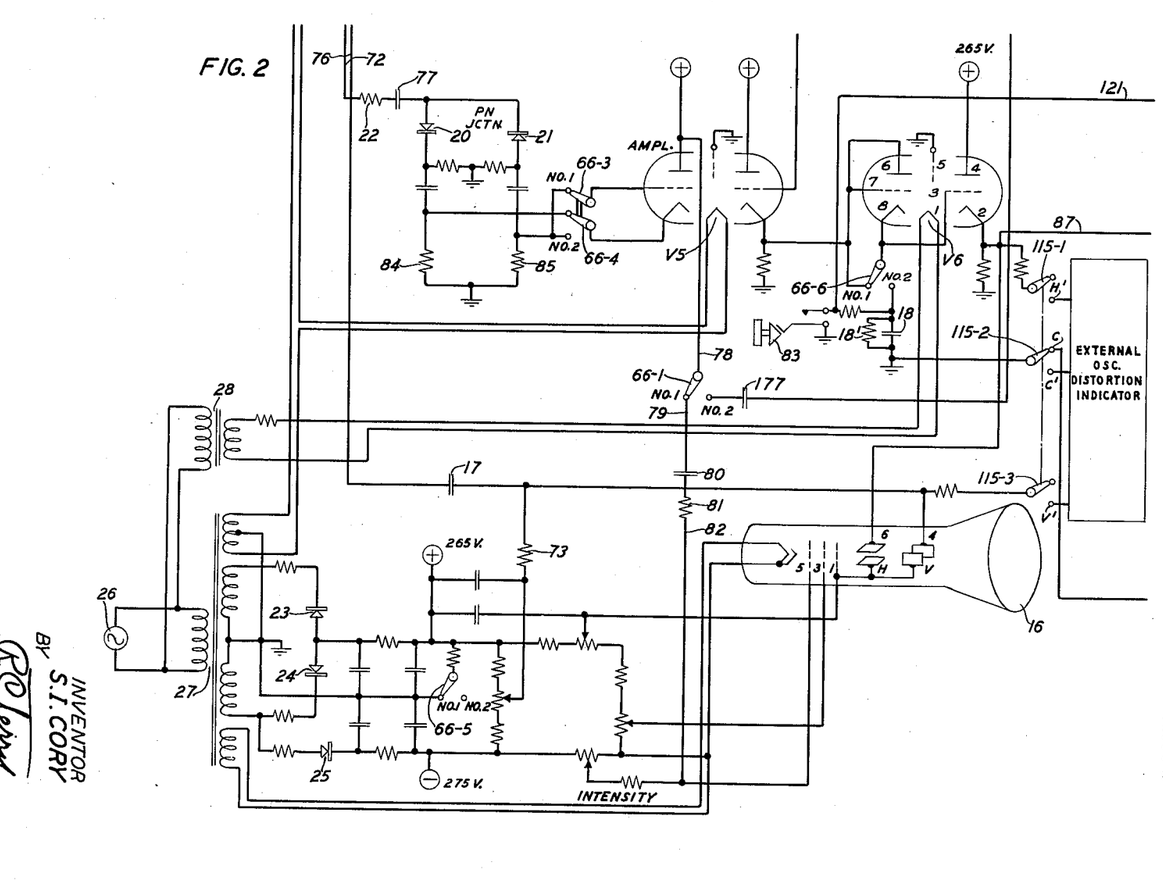

Terminals H', V' and C' in Fig. 2 may be provided to which one or more oscilloscopes of any desired size may be connected, from time to time, by means of switch 115 or other suitable means so that distortion may be observed at one or more locations by groups of people, as in connection with demonstrations. The H' terminal is arranged to receive the triangular-shaped sweep voltage which is normally applied to horizontal plate No. 6 of cathode-ray tube 16 by the cathode circuit of the right-hand triode of tube V6. The V' terminal is arranged to receive the voltage pips which are normally applied to vertical plate No. 4 of tube 16 through condenser 17 of one of the differentiating circuits. The C' terminal is connected to the reference ground of the measuring set.

*Adjustment of bias potentiometer*

The method of adjusting bias potentiometer 33 as described herein, improves the accuracy of the bias indication, especially when the measuring set is operated with rounded wave shapes as usually received at the end of a subscriber's or customer's loop circuit. This method is referred to herein as a "static" method in that it uses steady marking current flowing through the input of the set. Since other controls employed in the set of the present invention can be set properly on regularly received signals, local checks with good, or test, signals are not required. This is a considerable advantage for a set adapted for portable use.

The input trigger-tube circuit which includes tube V1 is designed to have operating characteristics similar to those of an electromagnetic relay in good electrical and mechanical condition.

The receiving relay of a measuring set such as disclosed in Patents 2,132,278 and 2,370,685, respectively, granted to F. A. Cowan and Rea et al., supra, is generally adjusted with 20-cycle ringing current having a sine wave shape. When properly adjusted the relay operates at nearly the mid-point of the wave, that is, at nearly zero current. The operating point obtained with this dynamic test is a little above the point of zero current in one direction and the releasing point is a little below zero current in the other direction. When a source of ringing current is not available, a static method of adjustment is used. In this case the relay is tilted in one direction and then in the opposite direction in order to cause the relay armature to fall to one contact and then to the other. The correct adjustment is obtained when the angle of tilt is the same in the two directions and of a given amount. The static method is reliable for relays in good mechanical condition.

When the input trigger-tube circuit including tube V1 is properly adjusted for polar signals the left-hand triode conducts when the operating current rises a little above its zero value in one direction and becomes non-conducting when the current falls a little below its zero value in the other direction. One of these operating points may be determined by reducing the operating current to zero value, that is, operating key CP to its closed position to provide a shunt path across the input, and adjusting bias potentiometer 33 in one direction until the pulse-timer circuit just runs freely as indicated by the triangular-shaped sweep voltage-wave on cathode-ray tube 16 or on the external oscilloscope when one is provided as hereinbefore mentioned. The other of these operating points may be determined by adjusting bias potentiometer 33 until the triangular-shaped sweep voltage-wave just stops, with the shunt still connected across the input. The correct adjustment is midway between these two operating points. The correct operating point for neutral signals is about one-half the value of the marking current. In order to determine these operating points for neutral signals the operating effect on the left-hand triode of tube V1 is reduced to half value by connecting a shunt path across the input resistor 31 which has a resistance value, say of 75 ohms, with resistor CN' of the same resistance value, and this shunt path may be had by operating key CN to its closed position. Bias potentiometer 33 is then adjusted, first, in one direction and then in the opposite direction as hereinbefore described for polar signals. The correct setting of bias potentiometer 33 is then midway between the two operating points.

What is claimed is:

1. A device for displaying along an axis of the screen of a cathode ray tube luminous manifestations to indicate and measure bias, end distortion and peak distortion of telegraph signals comprising a source of start-stop permutation code signals, a cathode ray tube, an input circuit for receiving signals from said source, a signal timer circuit operative in response to the start element of a signal applied to said input circuit to maintain itself in a fixed operated condition for a predetermined duration, a pulse timer circuit for timing the elements of a start-stop permutation code signal and means connected therewith responsive to the operation of said signal timer circuit for producing for each of said signals from said source a uniform triangular-shaped wave having cycles corresponding in number to the elements in a signal from said source, circuit means for impressing said triangular-shaped wave voltages on the horizontal deflection plates of said cathode ray tube to produce a cathodic beam sweep traveling to and fro for each cycle at a uniform rate across an axis of said tube, and a differentiating circuit path responsive to a portion of the output voltage of said input circuit for causing a momentary vertical deflection in said cathodic beam sweep to produce a momentary "pip" of light in conjunction with the sweep whereby any displacement of an incoming signal transition from its correct position is indicated.

2. A device for displaying along an axis of the screen of a cathode ray tube luminous manifestations on one side only of a zero deflection position on said axis, to indicate and measure bias, end distortion and peak distortion of telegraph signals comprising a source of start-stop permutation code signals, a cathode ray tube, an input circuit for receiving signals from said source, a signal timer circuit operative in response to the start element of a signal applied to said input circuit to maintain itself in a fixed operated condition for a predetermined duration, a pulse timer circuit for timing the elements of a signal and means connected therewith responsive to the operation of said signal timer circuit for producing for each of said signals from said source a uniform triangular wave having cycles corresponding in number to the elements in any signal from said source, circuit means for impressing said triangular-shaped wave voltage on the horizontal deflection plates of said cathode ray tube to produce a cathodic beam sweep traveling to and fro for each cycle at a uniform rate across an axis of said tube, a differentiating circuit including rectifying means and responsive to a portion of the output voltage of said input circuit for causing simultaneously with each transition of a signal incoming from said source a sharp momentary uniform increase of voltage in either of two directions, switching means for selecting the direction of voltage increase, other circuit means for utilizing the increase in voltage in one direction to intensify the luminosity of the manifestation to indicate bias and end distortion on the sweep along the axis of the screen of said tube, and a third circuit means for utilizing the increase in voltage in the other of said directions to sample at the time of a transition in the incoming signal the uniform triangular-shaped wave voltage, rectifying means for rectifying said sampled voltage, storing means for storing the rectified sampled voltage, a fourth circuit means for impressing the voltage stored in said storing means on the horizontal plates of said tube to produce a spot of light in conjunction with the sweep along the axis of the screen of said tube whereby peak distortion is indicated.

3. A device for displaying along an axis of the screen of a cathode ray tube luminous manifestations on one side only of a zero deflection position of said axis, to indicate and measure end distortion and peak distortion of telegraph signals comprising a source of start-stop permutation code signals, a cathode ray tube, an input circuit for receiving signals from said source, a signal timer circuit operative in response to the start element of a signal applied to said input circuit to maintain itself in a fixed operated condition for a predetermined duration, a pulse timer circuit for timing the elements of a signal and means connected therewith responsive to the operation of said signal timer circuit for producing for each of said signals from said source a uniform triangular-shaped wave having cycles corresponding in number to the elements in any signal from said source, circuit means for impressing said triangular-shaped wave voltage on the horizontal deflection plates of said cathode ray tube to produce a cathodic beam sweep traveling to and fro for each cycle at a uniform rate across an axis of the screen of said tube, a differentiating circuit including rectifying means and responsive to a portion of the output voltage of said input circuit for causing simultaneously with each transition of a signal incoming from said source a sharp momentary uniform increase of voltage in either of two directions, switching means for selecting the direction of increase of voltage, other circuit means for utilizing the increase in voltage in one direction to intensify the luminosity of the manifestation to indicate bias and end distortion on the sweep along the axis of the face of said tube, and a third circuit means for utilizing the increase in voltage in the other of said directions to sample at the time of a transition in the incoming signal the uniform triangular wave voltage, rectifying means for rectifying said sampled voltage, storing means for storing the rectified sampled voltage, a fourth circuit means for impressing the stored voltage on the horizontal plates of said tube to produce a spot of light in conjunction with the sweep along the axis of the screen of said tube whereby peak distortion is indicated, and a fifth circuit means including a recording instrumentality for utilizing said stored voltage for producing a permanent record of said stored voltage whereby a permanent record of the peak distortion versus time is obtained.

4. A device for displaying along an axis on the screen of a cathode ray tube luminous manifestations on one side only of a zero deflection position of said axis to indicate and measure bias, end distortion and peak distortion of telegraph signals comprising a source of start-stop permutation code signals, a cathode ray tube, an input circuit for receiving signals from said source, a signal timer circuit operative in response to the start element of a signal applied to said input circuit to maintain itself in a fixed operated condition for a predetermined duration, a pulse timer circuit for timing the elements of a signal and means connected therewith responsive to the operation of said signal timer circuit for producing for each of said signals from said source a uniform triangular-shaped wave having cycles corresponding in number to the elements in any signal from said source, circuit means for impressing said triangular-shaped wave voltage on the horizontal deflection plates of said cathode ray tube to produce a cathodic beam sweep traveling to and fro for each cycle at a uniform rate across an axis of the screen of said tube, a differentiating circuit including rectifying means and responsive to a portion of the output voltage of said input circuit for causing simultaneously with each transition of a signal incoming from said source a sharp momentary uniform increase of voltage in either of two directions, switching means for selecting the direction of increase of voltage, other circuit means for utilizing the increase of voltage in one direction to intensify the luminosity of the manifestation to indicate bias and end distortion on the sweep along the axis of said tube, and a third circuit means for utilizing the increase in voltage in the other of said directions to sample at the time of a transition in the incoming signal the uniform triangular-shaped wave voltage, rectifying means for rectifying said sampled voltage, storing means for storing the rectified sampled voltage, a fourth circuit means for impressing the voltage stored in said storing means on the horizontal plates of said tube to produce a spot of light in conjunction with the sweep along the axis of said tube whereby peak distortion is indicated, and resetting means including a timing device for automatically restoring said storing means to normal at regularly recurring intervals each of predetermined duration.

5. A device for displaying along an axis on the screen of a cathode ray tube luminous manifestations on one side only of a zero deflection position on said axis, to indicate and measure bias, end distortion and peak distortion of telegraph signals comprising a source of start-stop permutation code signals, a cathode ray tube, an electronic input circuit for receiving signals from said source and for reversing the sign of the elements of said signals, an electronic character timer circuit operative in response to the start element of a signal applied to said electronic input circuit to maintain itself in an alternate stable condition for a predetermined duration, an electronic pulse timer circuit and an integrating circuit connected thereto responsive to the operation of said character timer circuit for producing for each of said signals from said source a uniform triangular-shaped wave having cycles corresponding in number to the elements in any signal from said source, circuit means for impressing the voltage of said triangular-shaped wave on the horizontal deflection plates of said cathode ray tube to produce a sweep traveling to and fro for each cycle at a uniform rate across the horizontal axis of the screen of said tube, a differentiating circuit including a condenser and a vertical plate of said cathode ray tube and responsive to a portion of the output voltage of said input circuit for causing a momentary vertical deflection in the cathodic beam to produce a short momentary vertical "pip" of light along the horizontal sweep whereby any displacement of an incoming signal transition from its correct position is indicated, another differentiating circuit responsive to another portion of the output voltage from said input circuit and including a condenser and a pair of rectifiers connected in parallel thereto, and circuit means for sampling the voltage of the uniform triangular wave at times of occurrence of transitions in the signals from said source, other circuit means for storing said sampled voltages, and a third circuit means for impressing said stored voltages on the horizontal deflection plates of said tube to produce along the sweep across the horizontal axis of the screen of said tube a spot of light for indicating the amount of peak distortion.

6. A device for displaying along an axis on the screen of a cathode ray tube luminous manifestations on one side only of the zero deflection position of said axis, to indicate and measure bias, end distortion and peak distortion of telegraph signals comprising a source of start-stop permutation code signals, a cathode ray tube, an electronic input circuit for receiving signals from said source, an electronic signal timer circuit operative in response to the start element of a signal applied to said input circuit to maintain itself in a fixed operated condition for a predetermined duration, an electronic pulse timer circuit for timing the elements of a signal and means connected therewith responsive to the operation of said signal timer circuit for producing for each of said signals from said source a uniform triangular-shaped wave having cycles corresponding in number to the elements in the signal, circuit means for impressing said triangular-shaped wave voltages on the horizontal deflection plates of said cathode ray tube to produce a cathodic beam sweep traveling to and fro for each cycle at a uniform rate across the axis of the screen of said tube, a source of steady potential and a potentiometer connected thereto for biasing said electronic input circuit, a second source of steady potential for operating said electronic input circuit, means for calibrating said device comprising means for closing a shunt path across said source of signals whereby current from said signal source is prevented from flowing into said input circuit, and means manually operable during the time when signal source shunting means is closed for adjusting said potentiometer in one direction until said electronic pulse timer begins to operate freely with energy furnished by said source of steady potential, and then in the other direction until the said electronic pulse timer stops operating, whereby the mid-point between said point of beginning and said point of stopping is the desired calibrated position.

7. In a device for displaying along an axis on the screen of a cathode ray tube luminous manifestations on one side only of a zero deflection position of said axis, to indicate and measure bias, end distortion and peak distortion of telegraph signals comprising a source of start-stop permutation code signals, a cathode ray tube, an electron discharge input circuit for receiving signals from said source, an electron discharge signal timer circuit operative in response to the start element of a signal applied to said input circuit to maintain itself in a fixed operated condition for a predetermined duration, an electron discharge pulse timer circuit for timing the elements of a signal and means connected therewith responsive to the operation of said signal timer circuit for producing for each of said signals from said source a uniform triangular-shaped wave having cycles corresponding in number to the elements in a signal from said source, circuit means for impressing said triangular-shaped wave voltages on the horizontal deflection plates of said cathode ray tube to produce a cathodic beam sweep traveling to and fro for each cycle at a uniform rate across the axis of the screen of said tube, a method of calibrating said device consisting in shunting signals away from the electron discharge input circuit, varying in one direction the steady biasing potential normally applied to said electron discharge input circuit when said circuit is idle, until the instant when the input circuit starts operating to operate said electron discharge pulse timer circuit for a definite duration, varying in another direction the steady biasing potential until the instant when the input circuit stops operating whereby the electron discharge pulse timer circuit stops operating, and changing the steady biasing potential to a value midway between the instantaneous values whereat the operation of said input circuit starts and stops, respectively.

SAMUEL I. CORY.

References Cited in the file of this patent

UNITED STATES PATENTS

| Number | Name | Date |
| --- | --- | --- |
| 2,107,149 | Hearn | Feb. 1, 1938 |
| 2,132,678 | Cowan | Oct. 11, 1938 |
| 2,480,878 | Rea | Sept. 6, 1949 |
| 2,481,354 | Schuler | Sept. 6, 1949 |